US00RE40060E

(19) United States
(12) Reissued Patent
Mirsch et al.

(10) Patent Number: US RE40,060 E
(45) Date of Reissued Patent: Feb. 12, 2008

(54) FUEL CELL SYSTEM

(75) Inventors: Dietmar Mirsch, Kirchheim-Nabern (DE); Bernd Scheiterlein, Crailsheim (DE)

(73) Assignee: NuCellSys GmbH, Kirchheim/Teck-Nabern (DE)

(21) Appl. No.: 11/050,625

(22) Filed: Feb. 4, 2005

Related U.S. Patent Documents

Reissue of:
(64) Patent No.: 6,596,425
Issued: Jul. 22, 2003
Appl. No.: 09/812,890
Filed: Mar. 21, 2001

(30) Foreign Application Priority Data

Mar. 21, 2000 (DE) ..... 100 13 687

(51) Int. Cl.
*H01M 8/04* (2006.01)

(52) U.S. Cl. ..... 429/26; 429/13; 429/24; 429/39

(58) Field of Classification Search ..... 429/13, 429/24, 26
See application file for complete search history.

(56) References Cited

U.S. PATENT DOCUMENTS

| | | | | |
|---|---|---|---|---|
| 4,037,024 A | | 7/1977 | Landau | |
| 5,271,916 A | | 12/1993 | Vanderborgh et al. | |
| 5,360,679 A | * | 11/1994 | Buswell et al. | 429/19 |
| 5,441,821 A | | 8/1995 | Merritt et al. | |
| 5,518,705 A | | 5/1996 | Buswell et al. | |
| 5,753,383 A | | 5/1998 | Cargnelli et al. | |
| 5,798,186 A | | 8/1998 | Fletcher et al. | |
| 5,874,051 A | | 2/1999 | Heil et al. | |
| 5,996,976 A | | 12/1999 | Murphy et al. | |
| 6,124,052 A | | 9/2000 | Katoh et al. | |
| 6,277,508 B1 | | 8/2001 | Reiser et al. | |
| 6,383,671 B1 | * | 5/2002 | Andrews et al. | 429/24 |
| 6,428,915 B1 | | 8/2002 | Ban et al. | |
| 6,440,595 B1 | * | 8/2002 | Herdeg et al. | 429/26 |
| 6,479,177 B1 | | 11/2002 | Roberts et al. | |
| 6,620,536 B1 | | 9/2003 | Strobel et al. | |
| 2001/0021468 A1 | | 9/2001 | Kanai et al. | |

FOREIGN PATENT DOCUMENTS

| | | |
|---|---|---|
| DE | 198 32 389 A1 | 7/1998 |
| EP | 0 629 014 B1 | 4/1997 |
| EP | 0 913 357 A1 | 5/1999 |
| EP | 0 941 963 A1 | 9/1999 |
| EP | 0 989 621 A2 | 3/2000 |
| EP | 1 061 600 A2 | 12/2000 |
| EP | 1 106 571 A1 | 6/2001 |
| JP | 7326376 | 12/1995 |
| WO | WO 93/19005 | 9/1993 |

* cited by examiner

*Primary Examiner*—Jonathan Crepeau
(74) *Attorney, Agent, or Firm*—Crowell & Moring LLP

(57) ABSTRACT

A fuel cell system comprises a fuel cell unit and facility for humidifying process gases to provide a fuel for the fuel cell unit, wherein water-carrying media conduits of the fuel cell unit are provided at least in part as heatable media conduits.

14 Claims, 1 Drawing Sheet

FUEL CELL SYSTEM

Matter enclosed in heavy brackets [ ] appears in the original patent but forms no part of this reissue specification; matter printed in italics indicates the additions made by reissue.

BACKGROUND AND SUMMARY OF THE INVENTION

This application claims the priority of German patent document 100 13 687.7, filed Mar. 21, 2000, the disclosure of which is expressly incorporated by reference herein.

The invention relates to a fuel cell system having a facility for humidifying process gases to provide fuel for the fuel cell itself.

To prevent the electrode membrane from drying out it is necessary in fuel cells, particularly in those comprising proton-conducting electrolyte membranes (PEM cells), to humidify the process gases such as air or fuel gas. Water produced in the fuel cell, which is customarily extracted from the fuel cell off-gas by means of a water separator, can be used for this purpose, as disclosed, for example in European patent document EP 0 629 014 B1.

Particularly in mobile fuel cell systems comprising proton-conducting electrolyte membranes, high requirements are placed on the control of water balance.

Accordingly, it is an object of the invention to provide a fuel cell system with an improved supply of process water at low temperatures.

This and other objects and advantages are achieved by the fuel cell system according to the invention, in which heatable media conduits are provided downstream of a fuel cell unit, which media conduits are at least partially heatable. This structure has the advantages that process water in the media conduits can be kept liquid independently of ambient conditions, and that the risk of blockages, due to freezing water, of media conduits and/or of valves and pumps disposed in the media conduits is avoided.

Further advantages and refinements of the invention can be gathered from the further claims and the description.

Other objects, advantages and novel features of the present invention will become apparent from the following detailed description of the invention when considered in conjunction with the accompanying drawings.

DETAILED DESCRIPTION OF THE DRAWINGS

The invention is particularly suitable for fuel cell systems in mobile installations. A particular problem with such installations is that when the ambient temperature is below freezing, there is a risk that water present in the system will freeze, and will block conduits and valves and pumps. The installation cannot be started up then, and the components may be damaged by the ice as it forms.

According to the invention, media conduits are provided in the fuel cell system which are heatable. Particularly preferably, media conduits conveying liquid process water are at least partially heatable, at least downstream of a fuel cell.

Figure 1:
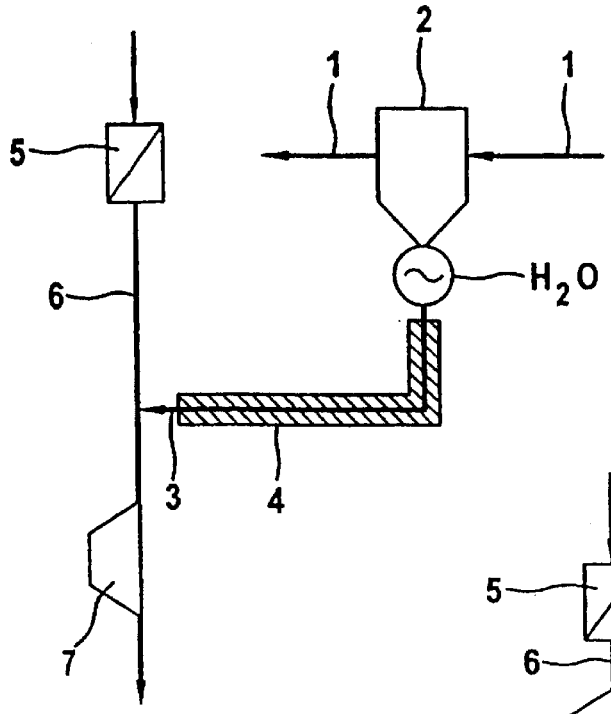
FIG. 1 is a schematic depiction of a preferred arrangement downstream of a water separator in a fuel cell system according to the invention.

FIG. 1 depicts a first preferred embodiment of the invention. Disposed in flow path 1 of cathode off-gas of a fuel cell unit (not shown) is a water separator 2, which extracts at least part of the water present in the cathode off-gas. Via a media conduit 3, the process water is passed to a process air humidification system. With the aid of a compressor 7, the process air is delivered, via an air filter 5 and a conduit 6, to the cathode side of a fuel cell unit (not shown). In the conduit 6, the process water from the cathode off-gas is admixed to the process air.

The media conduit 3 is provided with a heatable conduit section 4, or alternatively the entire media conduit 3 can be formed by the heatable conduit section 4, which is preferably electrically heatable. Beneficially, the heatable media conduit or the heatable conduit section 4 is disposed between a water separator 2 for separating water from cathode off-gas and a metering point for feeding media into the cathode air.

Advantageously, the heatable conduit section 4 is supplied with electrical power from a vehicle battery, (e.g., a 12 V battery), or with electrical power from the fuel cell unit. It can also be fitted with a control valve or a pump to adjust the amount of water fed into the process air.

Figure 2:
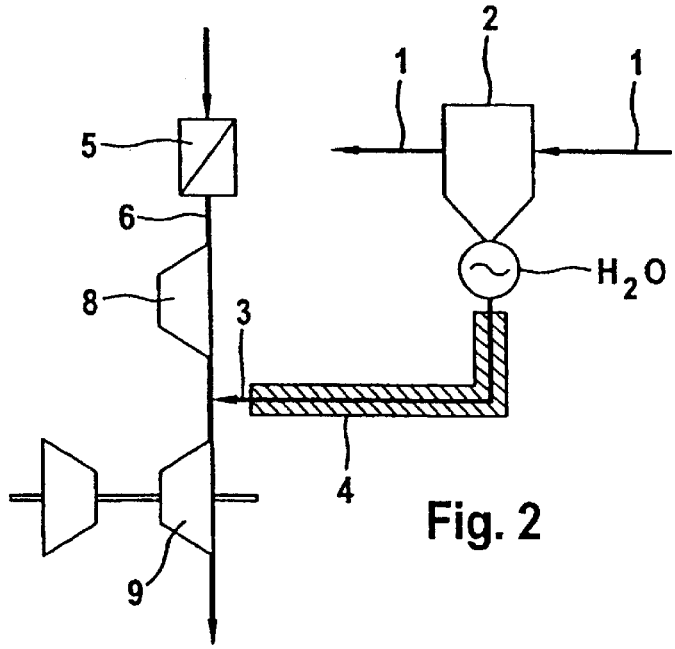
FIG. 2 is a further schematic depiction of a preferred arrangement downstream of a water separator.

FIG. 2 depicts a further preferred embodiment of the invention, which largely corresponds to that in FIG. 1, with identical elements labeled with identical reference symbols. In the illustrative embodiment shown, humidification in a two-stage compressor is provided. Via an air filter 5, process air passes into a conduit 6 and is compressed in a first compressor 8 and passed on to a second turbo compressor 9. The process water is introduced via the media conduit 3 or the heated conduit section 4 between the two compressors 8, 9 into the conduit 6.

At the metering point at which the process water is introduced into the process air conduit 6, a fine nozzle for introducing the process water is usually provided. The heated conduit section 4 advantageously ensures that no separate heating is required for this nozzle. The use of heated process water prevents water from freezing at the nozzle. This applies equally for any valves and/or pumps for adjusting the amount of the process water which are disposed in the media conduit 3.

Figure 3:
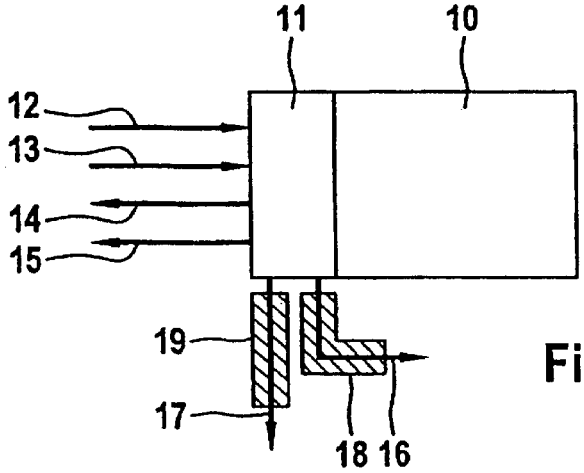
FIG. 3 shows a further preferred arrangement of a fuel cell with water removal.

FIG. 3 depicts a further preferred arrangement. A fuel cell unit 10 has an end plate 11 on which a first media feeder 12 for the anode and a media offtake 14 for the anode gas, and a second media feeder 13 for the cathode and a second media outlet 15 for the cathode off-gas are provided. (Details of how the media streams are subdivided in the interior of the fuel cell unit 10 are not part of the invention, and are not shown.) Also disposed on the end plate 11 are two water discharge lines 16, 17 which are provided to remove water from the fuel cell unit 10. Beneficially, these water removal lines 16, 17 are likewise provided with heatable conduit sections 18, 19. The water removal lines discharge water which collects in the anode or the cathode of the fuel cell unit 10, preferably into a holding tank of a water separator.

Expediently, all media conduits which may carry liquid water should, if possible, be provided with heatable conduit sections. When running down the fuel cell system it is beneficial to ensure that the water is flushed from the media conduits, so that as little water as possible remains in the system. An advantage of the invention is that even in the event of an emergency shutdown of the fuel cell system, when removal of the water from the system is not possible, the system can be started up again even at low external temperatures at which the water remaining in the system is in the form of ice.

The heatable conduits according to the invention can be made of flexible or rigid material, and can be surrounded by a suitable heating sleeve. Alternatively, they may have a suitable heating element inside the conduit.

Expediently, temperature monitoring of the system is provided in order to ensure that, in the event of the temperature dropping below a critical value (e.g., below the freezing point), the heatable media conduits are heated in the initial stage of starting up the fuel cell system, so that frozen water in the media conduits will be reliably liquefied. One option is to monitor the ambient temperature; alternatively, temperature monitoring in the respective temperature-critical regions of the fuel cell system, especially in or near water-carrying media conduits, can be carried out by one or more temperature sensors.

Another option is to provide for heating the heatable media conduits from time to time in the event of prolonged standstill of the system in a cold environment, if there is the threat of water freezing, in order to maintain the temperature of water-carrying media conduits essentially above the freezing point of water.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

[1. A fuel cell system comprising:

a fuel cell unit;

a humidifier unit for humidifying process gases to be fed to the fuel cell unit; and water-carrying media conduits which provide water to said humidifier unit;

wherein said water carrying media conduits include a heating component arranged to heat at least a portion thereof.]

2. The fuel cell system according to claim [1] *12*, further comprising a unit for extracting water from process gases of said fuel cell unit and providing it to said [media carrying conduits] *at least one media conduit*.

3. The fuel cell system according to claim [1] *12*, wherein said heating component is electrically powered and comprises at least a portion of said *at least one* media [conduits] *conduit*.

4. The fuel cell system according to claim [1] *12*, wherein the *at least one* media [conduits] *conduit* including said heating component [are] *is* provided downstream of the fuel cell unit.

5. The fuel cell system according to claim [1] *12*, wherein said *at least one* media [conduits] *conduit* including said heating component [are] *is* disposed between a water separator for separating water from cathode off-gas of said fuel cell and a metering point for feeding media into a cathode air input.

[6. The fuel cell system according to claim 1, further comprising a drain line for discharging water from the fuel cell unit, said drain line including a further heating component.]

7. A fuel cell system comprising:

a fuel cell unit;

a first conduit for providing process air to a cathode side input of said fuel cell unit;

a humidifier unit disposed in said first conduit for adding moisture to said process air;

a second conduit for providing water to said humidifier unit;

wherein said second conduit comprises a conduit section having a heating component for warming said water*;*

*the fuel cell system further comprises at least one temperature sensor;*

*the heating component is activated to heat said second conduit in dependence on a temperature monitored by said temperature sensor; and*

*the temperature sensor monitors ambient temperature*.

8. The fuel cell system according to claim 7, further comprising a unit for extracting water from process gases of said fuel cell unit and providing it to said second conduit.

9. The fuel cell system according to claim [1] *12*, wherein said heating component comprises a heating sleeve surrounding at least a portion of said media conduits.

10. The fuel cell system according to claim [1] *12*, wherein said heating component comprises a heating element inside said media conduits.

[11. The fuel cell system according to claim 1, further comprising at least one temperature sensor, wherein said heating component is activated to heat said at least a portion of said media conduits in dependence on a temperature monitored by said sensor.]

12. [The] *A* fuel cell system [according to claim 11, wherein] *comprising:*

*a fuel cell unit;*

*a humidifier unit for humidifying process gases to be fed to the fuel cell unit; and*

*at least one water-carrying media conduit which provides water to said humidifier unit; wherein,*

*said at least one water carrying media conduit includes a heating component arranged to heat at least a portion thereof;*

*the fuel cell system further comprises at least one temperature sensor;*

*the heating component is activated to heat said at least a portion of said at least one media conduit in dependence on a temperature monitored by said sensor; and*

[said] *the* temperature sensor monitors ambient temperature.

[13. The fuel cell system according to claim 11, wherein said temperature sensor monitors temperature of a region of said fuel cell system.]

[14. The fuel cell system according to claim 13, wherein said temperature sensor monitors temperature in proximity to said water carrying media conduits.]

*15. Temperature regulation apparatus for a fuel cell system having at least one fuel cell unit, said apparatus comprising:*

*a humidifier unit for humidifying process gases;*

*heating means for heating water fed to said humidifier, for humidifying said process gases; and*

*means for supplying heated humidified process gases from said humidifier to said fuel cell unit;*

*wherein, said heating means heats said water as a function of ambient temperature for said fuel cell system, as determined by a temperature sensor.*

*16. The apparatus according to claim 15, further comprising a unit for extracting water from exhaust gases from said fuel cell unit and providing it to said media conduit.*

*17. A method of operating a fuel cell system including at least one fuel cell, said method comprising:*

*providing a water supply;*

*humidifying a process gas stream by introducing water from said water supply into said gas stream;*

*feeding humidified process gas from said gas stream to said fuel cell; and*

*heating said water from said water supply prior to introduction of said water into said gas stream;*

*wherein heating of said water in said heating step is performed as a function of ambient temperature for said fuel cell system, as determined by a temperature sensor.*

*18. The method according to claim 17, wherein said water supply is provided by a water recovery unit which extracts water from exhaust gases from said fuel cell unit.*

*19. The method according to claim 17, wherein said heating step comprises heating at least a portion of a conduit which supplies water from said water supply to said humidifier.*

* * * * *